J. E. GILMAN.
REFRIGERATING APPARATUS.
APPLICATION FILED AUG. 7, 1918.

1,388,332.

Patented Aug. 23, 1921.
2 SHEETS—SHEET 2.

Fig. 2.

Inventor.
James E. Gilman
by Heard Smith & Tennant
Attys.

UNITED STATES PATENT OFFICE.

JAMES E. GILMAN, OF WINCHESTER, MASSACHUSETTS, ASSIGNOR OF ONE-HALF TO GEORGE A. AMBLER, OF WINCHESTER, MASSACHUSETTS.

REFRIGERATING APPARATUS.

1,388,332. Specification of Letters Patent. Patented Aug. 23, 1921.

Application filed August 7, 1918. Serial No. 248,721.

*To all whom it may concern:*

Be it known that I, JAMES E. GILMAN, a citizen of the United States, and resident of Winchester, county of Middlesex, and State of Massachusetts, have invented an Improvement in Refrigerating Apparatus, of which the following description in connection with the accompanying drawing, is a specification, like characters on the drawing representing like parts.

This invention relates to improvements in refrigerating apparatus.

The object thereof is to provide a novel means for reducing the temperature of the air of a compartment or of objects located at a distance from the refrigerating medium by means of a conduit containing a non-freezing medium which is circulated through said conduit and is cooled by the refrigerating medium during its passage through said conduit. More specifically the invention relates to improvements in soda fountain constructions which comprise one or more refrigerant compartments containing salted ice, a supply tank for the non-freezing circulating medium and a compartment for the jars of syrup, and contemplates the provision of a conduit leading from a pump through or near one or more of the refrigerant compartments and thence through the chamber containing the syrup jars, means being provided for maintaining a circulation of the non-freezing medium from the supply tank through the conduit whereby the temperature of said medium will be reduced during its passage through the refrigerant compartment so that it will effectively cool said syrup jars or other articles in the compartment for the syrup jars.

While the apparatus is specifically disclosed herein as employing as a refrigerating medium the brine formed by the melting salted ice, it will be understood that the cooling pipe may be filled with any other suitable non-freezing medium which may be furnished from any suitable reservoir which will maintain a supply and permit the necessary expansion and contraction of the circulating medium due to changes in temperature therein.

A further object of the invention consists in utilizing the salt water or brine from the sump tank after having thus been used to cool the syrup jars for the purpose of chilling the coolers for the soda and water which is delivered from the drafts of the fountain.

Another feature of the invention consists in providing means for recooling the circulating medium in said conduit prior to its distribution upon the coolers which lead to the drafts.

A further object of the invention is to provide a self contained and economical soda fountain construction in which all the containers for ice cream, syrups, and so forth, will be maintained at a substantially constant temperature sufficiently cold to prevent said contents from deteriorating or souring.

Other objects and features of the invention will more fully appear from the following description and accompanying drawings and will be pointed out in the annexed claims.

In the drawings:

Fig. 2 is a vertical transverse sectional view on lines 2—2 of Fig. 1, looking toward the right, the position of the conduit for the brine at the farther end of said cabinet, being shown in dotted lines.

Figure 1:
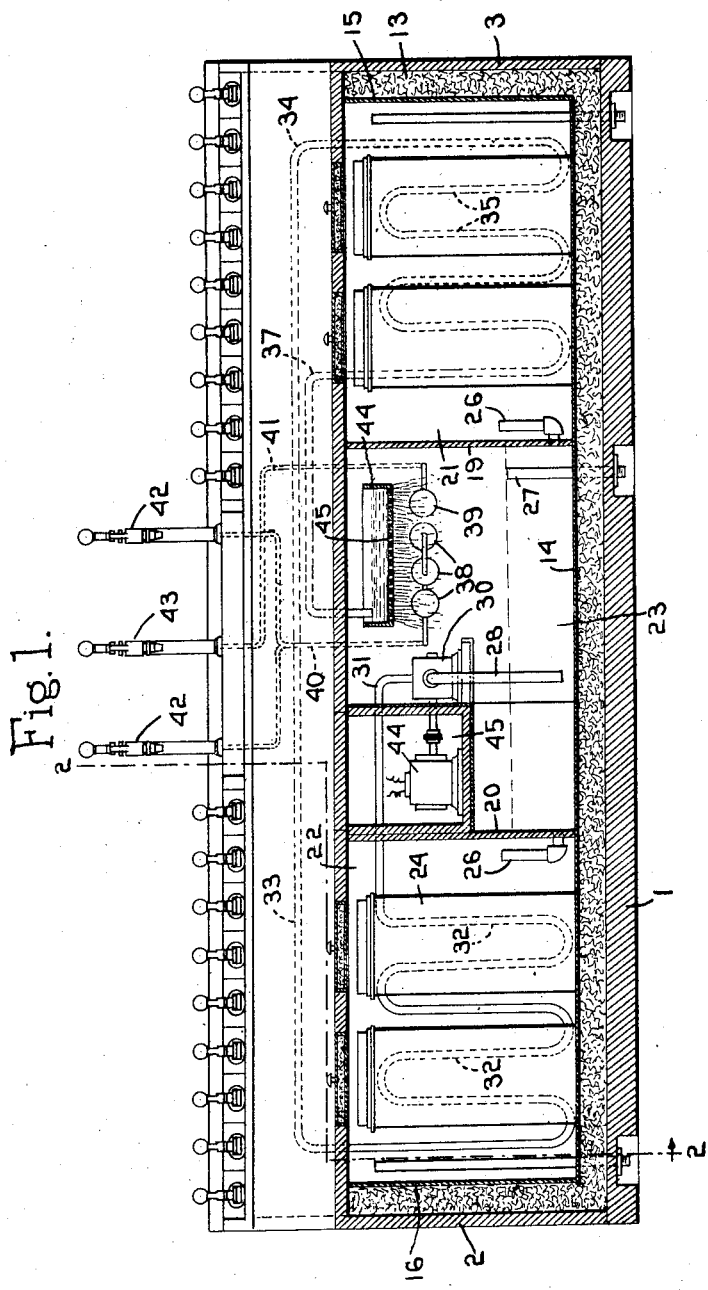
Figure 1 is a front view of a soda fountain taken partly in vertical section through the front portion of the cabinet.

While the invention relates generally to improvements in refrigerating apparatus, a preferred embodiment thereof is illustrated herein as applied to soda fountain constructions as the advantages of the construction and system are most effectively apparent in this type of apparatus which is desirably of compact form and ornamental appearance.

The soda fountain cabinet which is illustrated herein comprises a rectangular box-like structure having a base 1, ends 2—3, sides 4—5 and a top 6, all of which may be constructed of marble or any other suitable material. A false side 7 is desirably placed a short distance back from the front side 5 of the fountain to provide an insulating air space 8 which will prevent the condensation of water from the air upon the front of the fountain cabinet. The false side 7 may also form the wall of the rinsing tank. Any suitable partitions may be provided within the cabinet to form the rinsing tank or other reservoirs. As illustrated herein a vertical wall 9 extends longitudinally of the cabinet and serves as a support for the base 10 of a compartment 11 adapted to hold a series of syrup jars 12, the rearward wall of the compartment 11 being inclined in such a manner as to tilt the syrup jars. Within the cabinet formed by the walls 2, 3, 4, 9 and separated therefrom by a layer of insulating material 13, a casing is provided for the refrigerant compartments, the sump tank drain and so forth, the walls of the inner casing being preferably made of non-corrodable metal. The inner casing illustrated herein comprises a bottom 14, ends 15—16 and sides 17—18. Transverse walls 19—20 serve to partition off the ends of said inner casing to form refrigerant compartments 21—22 while the space between the walls 19—20 may be partitioned to form a sump tank 23 for the salt water from the refrigerant compartments and also a fresh water washing tank, the latter partition not being illustrated herein.

The refrigerant compartments 21—22 are provided with any suitable number of ice cream cans 24 which are adapted to be surrounded by salted ice 25. Near the bottom of each of the compartments 21—22 is a stand pipe 26 leading to the sump tank 23 and a suitable waste pipe 27 extends upwardly from the bottom of the sump tank to such a height as may be desirable to retain a sufficient supply of salt water in the sump tank. So far as I am aware, no means has heretofore been provided for cooling the syrup jars contained in the compartment 11, and the present invention contemplates using a circulating cooling fluid preferably the ice cold water from the sump tank at a temperature still further reduced which will maintain a coating of frost on the cooling pipe and will effectively cool the compartment in which syrup jars are located thereby preserving the contents of the jars.

In order to accomplish this, a conduit is provided leading from the supply tank through or adjacent the refrigerating medium and thence through the compartment in which the syrup jars are located, means being provided for maintaining the circulation of the liquid from the sump tank through said conduit when desired. As illustrated herein, this conduit comprises a pipe 28 having its lower end extending nearly to the bottom of the sump tank and its upper end leading to a preferably rotary pump 30 which draws water through it from the tank and delivers the same to a pipe 31 which runs into the refrigerant compartment 22 and has a section of sinuous curves 32 extending upwardly and downwardly through the salted ice in said compartment and leads thence to a section 33 which extends through the compartment 11 containing the syrup jars. The section 33 may be located in any suitable place in said compartment 11 but is preferably adjacent the walls or bottoms of the syrup jars. The section 33 of the pipe may discharge its contents into the sump tank but where a plurality of refrigerating compartments are utilized as illustrated herein, the circulating medium preferably is recooled and discharged upon the coolers which serve to chill the soda and water delivered at the drafts of the fountain.

Instead of carrying the conduit for the salt water from the sump tank through the salted ice in the refrigerating compartment as heretofore described, the pipe 33 may desirably lead to a section 34 which is provided with sinuous curves 35 lying in the fresh water compartment 36 which is in front of the refrigerating compartment 21 and thence through a suitable extension 37 to a convenient point above the sump tank. It is found in practice that the temperature of fresh or sweet water in the compartment or tank 36 is reduced substantially to freezing point by reason of its proximity to the salted ice in the refrigerating compartment and by carrying the cooling pipe through this fresh water instead of carrying it through the salted ice in the refrigerating compartment, the salt water in said pipe will be sufficiently chilled without unnecessarily causing the melting of salted ice as would be the case if it were located in the refrigerating compartment. As a matter of fact very satisfactory results may be obtained by carrying the cooling pipe through the fresh water compartments 36 alone. It is therefore to be understood that my invention contemplates the cooling of the salt water from the sump tank either by passing pipes containing the same through the refrigerating compartments or through compartments in proximity thereto which are affected by the refrigerating action of the material in the refrigerating compartment.

In all soda fountains it is customary to provide means for chilling the water and soda which are delivered at the drafts. The cooling means ordinarily is in the form of cylinders which are either located within the tank back of the refrigerating compartments or in the sump tank itself. In order more effectively to cool such cylinders and also to so support the cylinders that they are readily accessible for cleaning, means preferably are provided for supporting a battery of such cylinders above the sump tank in the path of the water discharged from the cooling pipe. As illustrated herein, the cooling cylinders 38 for the soda and 39 for the water are suitably supported a short distance above the level of the water in the sump tank and suitable pipes 40—41 lead from said cylinders to the drafts 42—43 respectively. A receptacle 44 having a perforated bottom 45 is supported above the coolers 38 and 39 and receives the water discharged from the cooling pipe after it has been rechilled by the refrigerating medium in the refrigerating compartment 21. The pump 30 may be driven in any suitable manner but preferably is driven directly by a small electric motor 44 which may be conveniently mounted in the chamber 45 located above the sump tank. The switch for the electric motor may be located at any convenient point so that it may be turned on or off as desired, for, obviously, it will not be necessary to maintain a continuous circulation of the salt water from the sump tank through the cooling pipe 33 to maintain the temperature in the compartment 11 containing the syrup jars sufficiently low to preserve the contents of the jars. The operation of the device is obvious. The ice cream cans are placed within the refrigerant compartments and packed as usual with salted ice. As the salted ice melts it passes through the stand pipe 26 into the sump tank 23 where it remains at substantially a freezing temperature. When it is desired to cool the compartment containing the syrup jars, the electric motor is turned on and the salt water from the sump tank drawn through the pipe 28 by the pump 30 and forced by said pump through the pipe 31 whence the salt water passes through the sinuous curves of the section 32 in the refrigerant compartment 22, thence through the pipe 33 which is located in the compartment 11 thereby reducing the temperature of said compartment sufficiently to properly preserve the contents of the syrup jars. Where there is a single refrigerant compartment, the water from the pipe 33 may then be discharged directly into the sump tank or utilized as heretofore described. Where a plurality of refrigerant compartments are present, the water from the sump tank preferably is carried from the pipe 33 through the pipes 34 and sinuous curves 35 into or adjacent the refrigerating media in another refrigerant compartment as the compartment 21 and is finally discharged into the ditributing reservoir 44 which sprays the rechilled salt water or brine upon the cooler through which soda and water are delivered to the drafts of the fountain. Of course the delivery of spray to the coolers may be omitted and the circulating medium discharged directly into the reservoir. Any other type of reservoir may be provided such for example as a cylinder connected in a circulating system, which cylinder is only partially filled with the fluid and consequently adapted to provide for the expansion and contraction of the circulating medium caused by changes in temperature.

By the construction above described the circulating medium can be sufficiently cooled to maintain a coating of frost or ice upon the cooling section of the pipe which runs through the chamber in which the syrup jars are located, thereby maintaining the contents of said syrup jars at a much lower temperature than any apparatus heretofore constructed.

It will be readily understood that the embodiment of my invention disclosed herein is illustrative but not restrictive and that various modifications in construction and arrangement of parts may be made within the meaning and scope of the claims which follow.

Having fully described my invention, what I claim as new and desire to secure by Letters Patent, is:

1. A soda fountain cabinet comprising a refrigerating compartment of sufficient size to receive salted ice with ice cream cans embedded therein, a tank for a circulating non-freezing medium and a cooling compartment, a conduit leading from said tank having a series of coils in said refrigerating compartment adapted to be embedded in the salted ice therein and a cooling section extending through said cooling compartment adapted to reduce the temperature of air and objects adjacent thereto in said compartment and a pump for causing circulation of said non-freezing medium through said conduit.

2. A soda fountain cabinet comprising a plurality of refrigerating compartments of sufficient size to receive salted ice and ice cream cans embedded therein, a cooling compartment, a sweet water compartment located adjacent to one of said refrigerating compartments, a tank for a circulating non-freezing medium, a conduit leading from said tank having a section provided with coils in said refrigerating compartment adapted to be embedded in the salted ice therein, a section extending through said cooling compartment and a section provided with coils extending into said sweet water compartment and a pump for circulating said non-freezing medium through said conduit.

3. A soda fountain cabinet comprising a refrigerating compartment of sufficient size to receive salted ice with ice cream cans embedded therein, a sump tank to receive water formed by the melting ice, a compartment containing syrup jars, a conduit leading from said sump tank having a series of coils in said refrigerating compartment adapted to be embedded in the salted ice therein and a section extending into the syrup jar compartment and lying in proximity to each of the syrup jars therein and a pump for causing the circulation of salt water from said sump tank through said conduit, a soda cooler having a draft and means for discharging the non-freezing medium from said conduit over said cooler.

In testimony whereof, I have signed my name to this specification.

JAMES E. GILMAN.